(12) United States Patent
Carragher et al.

(10) Patent No.: US 11,634,966 B2
(45) Date of Patent: Apr. 25, 2023

(54) COMBINED WELL PLUG/CHEMICAL HEATER ASSEMBLIES FOR USE IN DOWN-HOLE OPERATIONS AND ASSOCIATED HEATER CARTRIDGES

(71) Applicant: BiSN Tec Ltd, Warrington (GB)

(72) Inventors: Paul Carragher, Lymm (GB); Lance D Underwood, Morrsion, CO (US)

(73) Assignee: BiSN Tec. Ltd., Warrington (GB)

( * ) Notice: Subject to any disclaimer, the term of this patent is extended or adjusted under 35 U.S.C. 154(b) by 9 days.

(21) Appl. No.: 16/304,251

(22) PCT Filed: May 24, 2017

(86) PCT No.: PCT/GB2017/051458
§ 371 (c)(1),
(2) Date: Nov. 23, 2018

(87) PCT Pub. No.: WO2017/203248
PCT Pub. Date: Nov. 30, 2017

(65) Prior Publication Data
US 2020/0347696 A1 Nov. 5, 2020

(30) Foreign Application Priority Data

May 24, 2016 (GB) ..................................... 1609137
Aug. 19, 2016 (GB) ..................................... 1614227

(51) Int. Cl.
*E21B 36/00* (2006.01)
*E21B 33/13* (2006.01)
*E21B 33/134* (2006.01)

(52) U.S. Cl.
CPC ............ *E21B 33/13* (2013.01); *E21B 33/134* (2013.01); *E21B 36/00* (2013.01); *E21B 36/008* (2013.01)

(58) Field of Classification Search
CPC .............................. E21B 33/134; E21B 36/008
(Continued)

(56) References Cited

U.S. PATENT DOCUMENTS

| 1,534,229 A | 4/1925 | Livergood |
| 2,076,308 A | 4/1937 | Wells |

(Continued)

FOREIGN PATENT DOCUMENTS

| CA | 2592556 | 6/2007 |
| EP | 1 116 858 | 12/2000 |

(Continued)

OTHER PUBLICATIONS

Oct. 13, 2017, WIPO, PCT/GB2017/051458 Search Report.
Oct. 13, 2017, WIPO, PCT/GB2017/051458 Opinion.

*Primary Examiner* — Taras P Bemko

(57) ABSTRACT

The present invention provides a cartridge (1) for a chemical heater used in down-hole operations. The cartridge (1) comprises a quantity of a chemical reaction heat source (2) wrapped in a temporary coating (3) that is capable of maintaining the shape of the cartridge (1) prior to use but which is consumed during the burn of the heater. The present invention also provides a eutectic/bismuth based alloy well plugging/sealing tool (5). The tool (5) having a tubular heater body (6) with an internal cavity (8) capable of receiving a chemical heat source and a quantity of eutectic/bismuth based alloy (7) provided in thermal communication with the heater body (6) around an outer surface of the heater body (6). The tool has a sleeve (10) provided around an outer surface of the alloy (7), which insulates and/or mechanically protects the alloy (7) down-hole. In this way the sleeve (10) enables the diameter of tool (5) to be reduced whilst maintaining its functionality. In further aspect, the present invention also discloses the provision of a refractory lining (20) on the inner walls of the tubular heater body of chemical (Continued)

heaters, such as the heater (6) used in the eutectic/bismuth based alloy well plugging/sealing tool (5).

5 Claims, 3 Drawing Sheets

(58) Field of Classification Search
USPC .......................................................... 166/58
See application file for complete search history.

(56) References Cited

U.S. PATENT DOCUMENTS

| | | | |
|---|---|---|---|
| 2,686,689 | A | 8/1954 | Douglas |
| 2,789,004 | A | 4/1957 | Forster |
| 2,822,876 | A | 2/1958 | Murrow |
| 3,119,451 | A | 1/1964 | Hall |
| 3,170,516 | A | 2/1965 | Corley |
| 3,208,530 | A | 9/1965 | Allen |
| 3,871,315 | A | 3/1975 | Anderson |
| 4,134,452 | A | 1/1979 | Kingelin |
| 4,423,783 | A | 1/1984 | Haag |
| 4,488,747 | A | 12/1984 | Austin |
| 4,523,640 | A | 6/1985 | Wilson |
| 4,696,343 | A | 9/1987 | Anderson |
| 5,052,489 | A | 10/1991 | Carisella |
| 5,564,861 | A | 10/1996 | Khudenko |
| 5,631,440 | A * | 5/1997 | Thureson .................. C06C 5/04 102/275.7 |
| 5,833,001 | A * | 11/1998 | Song ....................... E21B 33/13 166/287 |
| 6,102,120 | A | 8/2000 | Chen |
| 6,454,001 | B1 | 9/2002 | Thompson |
| 6,474,414 | B1 | 11/2002 | Gonzalez |
| 6,664,522 | B2 | 12/2003 | Spencer |
| 6,828,531 | B2 | 12/2004 | Spencer |
| 6,923,263 | B2 | 8/2005 | Edin |
| 7,152,657 | B2 | 12/2006 | Bosma |
| 7,290,609 | B2 | 11/2007 | Wardlaw |
| 2002/0162596 | A1 | 4/2002 | Simpson |
| 2002/0056553 | A1 | 5/2002 | Duhon |
| 2003/0132224 | A1 | 7/2003 | Spencer |
| 2004/0149418 | A1 * | 8/2004 | Bosma .................... E21B 29/10 164/98 |
| 2004/0261994 | A1 | 12/2004 | Nguyen |
| 2005/0109511 | A1 | 5/2005 | Spencer |
| 2006/0144591 | A1 * | 7/2006 | Gonzalez ................. E21B 29/10 166/57 |
| 2007/0051514 | A1 | 3/2007 | La Rovere |
| 2010/0006289 | A1 | 1/2010 | Spencer |
| 2010/0126735 | A1 | 5/2010 | Allison |
| 2010/0263876 | A1 | 10/2010 | Frazier |
| 2011/0042087 | A1 * | 2/2011 | Challacombe .......... E21B 33/13 175/2 |
| 2011/0132223 | A1 | 6/2011 | Streibich |
| 2011/0146519 | A1 | 6/2011 | Han |
| 2011/0174484 | A1 | 7/2011 | Wright |
| 2011/0214855 | A1 | 9/2011 | Hart |
| 2012/0199351 | A1 | 8/2012 | Roberston |
| 2012/0298359 | A1 | 11/2012 | Eden |
| 2012/0312561 | A1 | 12/2012 | Hallundaek |
| 2013/0087335 | A1 | 4/2013 | Carraher |
| 2013/0192833 | A1 | 8/2013 | Gano |
| 2013/0277053 | A1 * | 10/2013 | Yeh .......................... E21B 34/14 166/278 |
| 2014/0318782 | A1 | 10/2014 | Bourque |
| 2015/0211326 | A1 | 7/2015 | Lowry |
| 2015/0211327 | A1 | 7/2015 | Lowry |
| 2015/0211328 | A1 | 7/2015 | Lowry |
| 2015/0345248 | A1 | 12/2015 | Carragher |
| 2015/0368542 | A1 * | 12/2015 | Carragher ............... C22C 12/00 166/288 |
| 2016/0145962 | A1 | 5/2016 | Carragher |
| 2016/0319633 | A1 | 11/2016 | Cooper |
| 2017/0030162 | A1 | 2/2017 | Carragher |
| 2017/0089168 | A1 | 3/2017 | Carragher |
| 2017/0226819 | A1 | 8/2017 | Carragher |
| 2017/0234093 | A1 | 8/2017 | Carragher |
| 2017/0234100 | A1 | 8/2017 | Carragher |
| 2017/0306717 | A1 * | 10/2017 | Carragher ............. E21B 33/138 |
| 2017/0335646 | A1 * | 11/2017 | Huang .................. E21B 34/063 |
| 2019/0085659 | A1 | 3/2019 | Carragher |
| 2019/0014355 | A1 | 5/2019 | Carragher |
| 2019/0186230 | A1 | 6/2019 | Carragher |
| 2020/0173250 | A1 | 6/2020 | Carragher |
| 2020/0248526 | A1 | 8/2020 | Carragher |
| 2020/0332620 | A1 | 10/2020 | Carragher |

FOREIGN PATENT DOCUMENTS

| | | |
|---|---|---|
| EP | 1 339 943 | 9/2003 |
| EP | 1 933 004 | 6/2008 |
| GB | 2016063 | 9/1979 |
| GB | 2 164 886 | 4/1986 |
| GB | 2 417 265 | 2/2006 |
| WO | WO 2011/151171 | 12/2011 |
| WO | WO 2013/066340 | 5/2013 |

\* cited by examiner

COMBINED WELL PLUG/CHEMICAL HEATER ASSEMBLIES FOR USE IN DOWN-HOLE OPERATIONS AND ASSOCIATED HEATER CARTRIDGES

This application claims priority under 35 USC 371 to International Application No. PCT/GB2017/051458, filed May 24, 2017, which application claims priority to application serial no. GB 1609137.3 (filed May 24, 2016) and application serial no. GB 1614227.5 (filed Aug. 19, 2016), the entire disclosure of each of which is incorporated herein by reference.

FIELD OF THE INVENTION

The present invention relates to well tools for use in down-hole operations, such as oil and gas well work. More specifically the invention relates to tools capable of setting eutectic/bismuth based alloy seals and plugs in various down-hole environments.

BACKGROUND OF THE INVENTION

Well plugs can be employed in both oil/gas well repair operations and in oil/gas well abandonment operations.

When a well, such as an oil or gas well, is at the end of its useful life it is usually abandoned. From time to time the operation of such wells can also be suspended for reasons such as low oil prices, "workovers" and other unexpected events that require the well to be temporary suspended (i.e. approaching storms or hurricanes). However before a well can be abandoned/suspended the well must be "plugged" to ensure that potentially hazardous materials, such as hydrocarbons, cannot escape the well.

In the past various methods have been employed to plug abandoned wells. One such known method involves pouring cement or resin into a well so as to fill a length of the well. However the use of cement/resin has proven to be unreliable and vulnerable to leaking. This can lead to previously abandoned wells being re-plugged at considerable extra expense.

In view of the limitations of using cement/resin to plug or seal wells an alternative approach was developed which uses a eutectic alloy, such as bismuth-containing alloy, to form a seal within the well. This approach, which is described in detail in CA 2592556 and U.S. Pat. No. 6,923,263, utilises the fact that such alloys contract upon melting and expand again when they re-solidify. Essentially the alloy is deployed into a well; heated until it melts and "slumps"; and then allowed to cool whereby the alloy expands to form a tight seal with the walls of the well.

The use of eutectic alloys, such as bismuth-containing alloys, to plug wells or repair existing plugs in wells is described in: U.S. Pat. Nos. 7,290,609; 7,152,657; US 2006/0144591; U.S. Pat. Nos. 6,828,531; 6,664,522; 6,474, 414; and US 2005/0109511.

In addition to their use in well abandonment, well plugs are also utilised in well completion operations. One common application is in the repair of Open Hole Gravel Packs (OHGP), where it is necessary to seal selected zones within the down-hole environment.

With well abandonment, well repair and well completion operations, it is the case that, before a plug or seal can be set within a well, the tool must first be delivered to the target region down-hole. This deployment process presents a number of problems, with one of the main challenges being access.

When dealing with deviated wells (i.e. wells that run in a direction that deviates from vertical) the passage of the tool from the surface to the target region (i.e. where the plug is to be deployed) can be torturous. Open Hole Gravel Packs are generally deviated wells.

The passage of the tool towards the target region can also be impeded by other obstacles in the path to the target region, such as a collapsed casing or abandoned equipment within the well.

In order to facilitate the travel of tools down wells having one or more of the above challenges it is known to reduce the size and diameter of the tools to make them more maneuverable. However such reductions lead to compromises on the functionality of the tool.

In the case of tools where a eutectic/bismuth based alloy is mounted on the exterior of a heater, a reduction of the outer diameter of the tool can be achieved by making the tool longer and thinner. However this can make the tool less maneuverable around the corners and s-bends, which are often present in highly deviated wells. Another approach to reducing the outer diameter of these tools is to reduce the size of the heater. However this reduces the heat output of the tools, which can lead to unsatisfactory heating of the alloy within the target region.

A further approach is to reduce the outer diameter of the tool by reducing the amount of alloy provided on the outside of the tool. This approach can lead to incomplete plugs being formed within the well due to the insufficient quantities of alloy present.

SUMMARY OF THE INVENTION

The present invention provides a number of improvements to both the cartridges used in down-hole chemical heaters, the heaters, and the well plugging/sealing tools used in down-hole operations, such as oil and gas well plugging/sealing in both well abandonment, well repairs (e.g. OHGP), and well completions.

The solutions of the present invention are considered particularly suitable for use in wells that are highly deviated, contain obstacles or combinations of both, and which, as such, would otherwise be difficult to plug or repair.

It is envisaged that, although the various aspects of the present invention described herein are particularly suitable for use in oil and gas wells, they can also be employed in other under-ground conduits (e.g. water conduits).

In a first aspect, the present invention provides a cartridge for a chemical heater used in down-hole operations, said cartridge comprising a quantity of a chemical reaction heat source wrapped in a temporary coating that is capable of maintaining the shape of the cartridge prior to use but which is consumed during the burn of the heater.

Providing the chemical heat source for down-well chemical heaters in the form of a self-contained cartridge allows for a greater range of flexibility during on-site operations.

In the past, chemical heaters have been manufactured off-site with the chemical heat source added at the manufacturing stage. This meant that the correct chemical heater would need to be selected in advance and any last minute changes in heating requirements would require the ordering of new chemical heater.

It will therefore be appreciated that providing the chemical heat source in the form of a self-contained cartridge gives much greater flexibility on site because the operators can choose the cartridge with the appropriate heating characteristic for the particular job and simply insert it into the tool on site, rather than waiting for a replacement tool to be manufactured and shipped to site.

Thus, providing a tool together with a range of cartridges (each having different heating characteristics) gives the end user, who may be located in a remote location (e.g. an offshore oil rig), the ability to make last minute adjustments. As described in WO 2014/096857 A2, it is possible to control the heating characteristics of chemical heaters by varying the mixtures used in the chemical reaction heat source.

Producing the chemical heat sources in the form of cartridges also provides for greater quality control in the mixtures and blends used in a particular batch. In this way the heating characteristics of a particular batch can be measured and checked before cartridges are shipped with the tool.

The primary function of the temporary coating is to ensure that the chemical heat source material, an example of which is a thermite-based blend, retains its shape and is protected from the environment during storage and transport. However, as the chemical heat source material will be inserted into a tool before it is deployed down-hole, the structural strength/resilience of the coating is not as important.

In view of this, the chemical heat source material is preferably wrapped in a plastic film (e.g. PVC) and further preferably the chemical heat source is shrink wrapped. It has been discovered that using a plastic film wrap makes it easier to slide the cartridge into the tool.

Another advantage of wrapping the chemical heat source material in a transparent plastic film is that the chemical heat source material is visible. This is particularly useful when the chemical heat source material is provided in the form of one or more solid blocks, because it enables visual inspection of the cartridge for gaps and breaks. It is appreciated that gaps and breaks in the chemical heat source material can cause problems during burning and thus should be minimised.

Advantageously the wrapped heat source of the cartridge may be held within a flexible elongate surround that is preferably tubular or sock-shaped. By placing the wrapped heat source in the surround it is envisaged that the cartridge may be provided with additional characteristics, such as improved insulation and/or improved structural strength or resistance to wear and tear.

Further preferably, the flexible surround may be formed from one or more of the following: fibre glass, thin steel, carbon fibre, and synthetic fibre of a high tensile strength (e.g. Kevlar®). It is envisaged that these materials provide the cartridge with the above mentioned additional characteristics (e.g. improved insulation in the case of fibre glass, carbon fibre and Kevlar and improved strength/resilience in the case of Kevlar®).

Further preferably, the flexible surround may be wrapped in an additional layer of the material used to wrap the chemical heat source material (e.g. plastic shrink wrap) so as to further help hold the cartridge together.

Preferably the chemical heat source material may be provided in the form of one or more solid blocks. In this way the heating characteristics of the cartridge can be better controlled and even varied along its length. However, it is appreciated that in some cases powdered material or fragmented block material can be employed.

It is envisioned that the cartridge of the first aspect of the present invention can be used in combination with a range of chemical heaters and combined plug/heater assemblies, including those described herein.

In a second aspect of the present invention one such combined plug/heater assembly is provided in the form of a well plugging/sealing tool.

In this regard the present invention provides a eutectic/bismuth based alloy well plugging/sealing tool, said tool comprising: a tubular heater body with an internal cavity capable of receiving a chemical heat source; a quantity of eutectic/bismuth based alloy provided in thermal communication with the heater body around an outer surface of the heater body; and a sleeve provided around an outer surface of the alloy.

As will be appreciated hereinafter, providing the tool with an outer sleeve that surrounds both the heater body and the alloy provides a number of technical benefits that facilitate the production of a tool with a reduced outer diameter, which is better suited for deployment down deviated wells and wells with in-path obstructions.

Although the disclosure primarily refers to eutectic and bismuth based alloys, it is envisaged that other alloys might suitably be employed in certain conditions. In particular, alloys referred to as low melt alloys' or low melting point alloys' (LMPA) are considered suitable. These alloys are defined as having a melting point of 385° C. or below. The chemical heater system that is the subject of this invention is capable of melting such alloys. In view of this, the present disclosure should be read as contemplating the use of not only eutectic and bismuth based alloys, but also LMPAs in the described tools and methods.

Preferably the tubular heater body, the alloy and the sleeve may be arranged co-axially to one another.

Advantageously the tubular heater body and the sleeve may define an annular space within which at least a portion of the alloy is enclosed. In this way a shielded region is provided to house at least a portion of the alloy.

It is appreciated that providing the alloy with a shielded region away from the harsh environment at the target region within a well can provide a number of benefits; details of which will be provided hereinafter.

Further preferably the annular space may further contain a spacer element with a greater structural strength than the alloy. In this way the spacer element, which can be formed for example from steel, provides structural protection to the softer alloy held within the annular space. This additional strength is particularly important during any machine handling of the well plugging/sealing tool prior to and during its insertion within a well opening.

It will be appreciated that providing the tool with a region of greater structural strength enables the well tool to be gripped in that region by the machinery that is typically used to deliver well tools to the well opening. In the absence of the strengthened region it is possible that the softer alloy could be vulnerable to being crushed, along with the outer sleeve, when the tool is gripped by the handling machinery.

It is also appreciated that providing the strengthened region enables the thickness of the sleeve, which is on the outside of the tool, to be reduced. This helps further reduce the overall diameter of the tool, which is one of the key aims of the present invention.

Preferably the sleeve may be formed from a material with insulating properties. Providing the sleeve with insulating properties is highly beneficial because it serves to reduce heat loss from the tool of the present invention. This means that any heat generated by the tool is used more efficiently, which in turn means that less chemical heat source material is needed to achieve the required heat output.

This more efficient use of the chemical heat source material means that less space needs to be given over to the cavity in the heater body, which in turn enables the overall diameter of the well plugging/sealing tool to be decreased without necessarily having to also increase the length of the plug.

Providing an outer sleeve with insulating properties also helps to prevent heat being 'sucked' away from the tool as a consequence of the environmental conditions within the target region. By way of an example, it is envisioned that insulating the tool in this way prevents heat loss as a result of cross-flow within the well.

Cross-flow occurs when fluids move down a pressure gradient within the well and, in doing so, create a flow of fluids past the target region, which can remove heat from the region over time.

Providing the insulating sleeve also helps to 'super heat' the alloy that is held between the heater body and the sleeve. Super heating the molten alloy enables the alloy to penetrate further into the surrounding environment when it eventually leaves the tool. This is considered particularly beneficial when forming seals in wells located in sand pack formations.

Additionally or alternatively the sleeve may be formed from a material which has structural strength. Providing a sleeve with increased structural strength helps to protect the well tool as it is deployed down-hole. This is considered particularly important in the case of highly deviated wells because it is not uncommon for well tools to be dragged across substantially horizontal regions, which can subject the well tool to stresses.

In view of the above benefits the sleeve is preferably formed from one or more of the following: fibre glass, thin steel, carbon fibre, and synthetic fibre of a high tensile strength (e.g. Kevlar®).

The above identified materials are considered suitable for the sleeve because they are capable of providing insulating properties and/or structural strength/durability even when provided in relatively low thickness. By way of example it has been discovered that a few millimetres of fibreglass bonded to the well plug using epoxy resin has an insulation value that is 200 times that of steel. Once again this helps keep the overall diameter of the well tool to a minimum.

It is envisaged that the material may be used in combination to achieve both insulating and structural benefits. In addition, it is envisaged that composite materials capable of providing both benefits may also be employed to form the sleeve.

Advantageously the sleeve may further be provided with wear pads that extend radially outwards from the sleeve. In this way the well tool can be better protected against the stresses imparted on the well tool as it is dragged across substantially horizontal regions of wells, for example. As the person skilled in the art will be well aware of suitable types of wear pads they will not be discussed in further detail here.

Preferably the sleeve may not extend the full length of the heater body and/or the alloy.

Extending the sleeve along only a portion of the alloy serves to control the location on the well tool from which the molten alloy is released. That is to say, the alloy is trapped between the heater and the sleeve (i.e. in the annular space) until the sleeve ends—at which point the molten alloy is free to escape into the surrounding environment.

This focusing of the alloy is considered particularly advantageous when setting plugs in oil and gas wells that employ sand screens (i.e. Open Hole Gravel Packs).

By way of some brief background, Open Hole Gravel Packs (OHGP) employ screens to hold back the surrounding proppant (e.g. sand) whilst allowing the oil/gas to be extracted. However, these 'sand screens' present a problem when it comes to sealing off zones within this environment because it is not possible to pump resin, epoxy or cement through the screens to seal of the annulus.

In contrast, the viscosity of the molten eutectic/bismuth based alloy is such that it can flow out through the screens and reach the surrounding sand, for example. This eliminates the need to perforate the screen, which can potentially destroy the completion. Thus the use of an alloy to seal OHGP zones has advantages.

The inventors have discovered in deviated wells, however, that if molten alloy is allowed to flow freely from the well tool the alloy will essentially drip through the screen along the whole length of the well tool. This leads to the creation of multiple small moulds of alloy on the outside of the screen rather than a complete seal.

In order to address this problem it has been found that providing a sleeve which does not extend the full length of the well tool ensures that the location at which the alloy is deployed from the tool is more focused.

As a result a single seal is produced at the desired location (i.e. adjacent to the point where the overlap between the sleeve and the alloy/heater ends) instead of lots of smaller alloy mounds along the length of the screen.

In addition, it has also been discovered that having the heater extend beyond the sleeve provides the further benefit of heating the area where the seal is to be formed, which helps the alloy to stay molten for longer and thus penetrate further through the surrounding sand screen.

Although this approach to focusing the molten alloy is considered highly effective it is also envisioned that, in arrangements where the sleeve extends along the entire length of the well tool, the sleeve may be provided with weakened regions that perish before the main body of the sleeve and, in so doing, provide clearly defined conduits for the molten alloy to escape.

Preferably the well tool may further comprise connection means for attaching the well plugging/sealing tool to a well deployment tool. Further preferably the connection means may secure the heater body and the sleeve together.

Additionally, or alternatively, the heater body may be connected to the sleeve via the spacer element provided in the annular space between the heater body and the sleeve.

Preferably the well tool may further comprise resilient basing means located within the cavity of the tubular heater body that are configured to impart pressure on any chemical heat source received with the cavity.

In this way any chemical heat source material housed within the cavity is urged together so as to eliminate any gaps, which could affect the passage of the chemical reaction from the ignition means along the length of the heater.

If the chemical heat source material is provided in the form of a plurality of blocks that are urged together, it is considered advantageous to further provide chemical heat source material in a powdered form so as to fill any spaces that may be formed between adjacent blocks and also between the blocks and the heater body.

Preferably the inside surface of the tubular heater body may also be provided with a refractory lining that, in use, is located between the chemical heat source and the heater body. Examples of materials that are considered suitable for the refractory lining include fibre glass, Kevlar® and a coating of ceramic material, such as zirconium oxide ($ZrO_2$), aluminium oxide, magnesium oxide. Other suitable refractory materials will be appreciated by the skilled person upon consideration of the following explanation.

It is envisaged that zirconium oxide may also be partially stabilized using dopants such as yttrium oxide, magnesium oxide, calcium oxide, and cerium(III) oxide. Zirconium oxide may also be referred to as zirconium dioxide and zirconia.

The refractory material is provided as a coating on the inner walls of the heater body because the mechanical properties of refractory materials typically do not make them suitable for construction of the entire heater body, which needs to maintain its structural integrity under the increased mechanical stresses placed on the heater when it is deployed down-hole.

Coating the inside of the heater body with a refractory lining provides a number of benefits.

One benefit of having a lining within the heater body is that it prevents the chemical heat source material (e.g. thermite) from sticking to the inside surface of the heater body. This is a problem in heaters where it is desirable for the molten heat source to flow within the heater body. Essentially the refractory lining serves to reduce the wettability of the inside surface of the heater body and prevent the heat source material clumping within the cavity.

Preventing the molten heat source material from sticking to the heater body stops the heat source material from concentrating heat in a particular spot and melting through the wall of the heater body at that point.

Another benefit of the refractory lining is that it affords some heat shielding to walls of the heater body, which in turn enables the heater body walls to be made thinner without risk of them being burned through.

Preferably the lining may be made from fibre glass, Kevlar®, or provided as a ceramic layer coated on the inner walls of the tubular heater body. One example of a suitable ceramic material is $ZrO_2$. By way of some background it is note that refractory coatings are often used, in the casting industry, in equipment to transfer molten metals. However these are generally used in conjunction with low-melting point alloys such as aluminium or bronze, which have melting points in the range of 500 to 1000 degrees C.

Refractory coatings are generally not recommended for use with high-temperature molten materials such as iron or steel. This is relevant because steel is one of the preferred materials used for chemical heater bodies of the present invention. In contrast to aluminium and bronze, iron and steel have melting points of about 1500 and 1400 degrees C., respectively.

The aluminium/iron oxide thermite which is commonly used as the chemical reaction heat source in the heaters of the present invention, in further contrast, has a reaction temperature of about 3200 degrees C.

Typically, refractory coatings are generally only rated to a range of about 1500 to 1800 degrees C. Therefore one would not normally consider a refractory coating as a viable method to protect a steel heater tube from molten thermite.

However, the inventors have surprisingly discovered that heater body 'burn-throughs', when they do occur, usually happen within less than a minute after the thermite is ignited. In view of this, the inventors determined that if a refractory coating could survive long enough for the heater tube to endure this critical one-minute interval, 'burn-throughs' could be prevented.

Zirconium oxide was selected as the coating material for testing based on its relatively high (1800 degrees C.) operating temperature rating, and on the fact that its coefficient of thermal expansion (CTE) is closer to that of steel than do most other ceramic materials. This is an advantage because the greater the mismatch in CTE, the more likely a coating is to spall off the heater tube walls at elevated temperatures.

Also, zirconium oxide has low thermal conductivity, which can provide some benefit in delaying, or spreading out over time, the heat transfer from the termite reaction products to a steel heater tube, for example. Perhaps more importantly, zirconium oxide does not have a chemical affinity to iron, and thus is less likely to be wetted by the iron by-products from the termite reaction.

Although the refractory lining is preferably used in combination with the outer sleeve in the tool of the present invention, it is envisaged that the benefits provided the refractory lining mean that it could also be employed in a wide variety of down-hole chemical heaters including those that do not have an outer sleeve in accordance with the second aspect of the present invention.

In view of this, a third aspect of the present invention provides a chemical heater for use in down-hole operations, the heater comprising a tubular heater body with an internal cavity defined by internal walls; wherein the internal walls are provided with a refractory lining.

Preferably the chemical heater comprises a chemical heat source material housed within the internal cavity of the tubular heater body. Typically the chemical heat source material will be provided as thermite in powdered, solid block or fragmented solid block (i.e. crumble) form.

Preferably the tubular body of the heater is formed from steel.

Preferably the refractory lining may comprise fibre glass; Kevlar®; a coating of a ceramic material; such as zirconium oxide ($ZrO_2$), aluminium oxide and magnesium oxide; and combinations thereof.

Preferably the refractory lining may comprise a material with a similar coefficient of thermal expansion (CTE) to the material used to form the tubular body of the heater.

It is envisaged that, in addition to being coated with the refractory lining, the chemical heater of this aspect of the present invention may be provided with one or more of the further features described below with regard to the other described aspects of the present invention.

The present invention also provides a eutectic/bismuth based alloy well plugging/sealing tool that comprises the lined chemical heater of the third aspect of the present invention.

Advantageously, both the well plugging/sealing tool of the second aspect of the present invention and the refractory lined chemical heater of the third aspect of the present invention described above may further comprise a cartridge according to the first aspect of the present invention.

A particular additional advantage is obtained when the cartridge used in the well tool is provided with the flexible elongate surround. This is because the surround provides additional protection to the walls of the surround heater body from any heat spikes generated by the chemical heater source material of the cartridge.

A fourth aspect of the present invention provides a variant of the heater cartridge of the first aspect of the present invention. In this regard the present invention provides a cartridge for a chemical heater used in down-hole operations, said cartridge comprises a quantity of a chemical reaction heat source material at least partially surrounded with a refractory material.

Preferably the chemical reaction heat source material is provided as one or more stacked blocks and the refractory material is provided in the form of a ceramic coating (e.g. zirconium oxide) on the outside of the stack.

Alternatively, the stacked blocks may be surrounded with fibreglass or Kevlar®. It is appreciated that when the refractory lining is provided in the form of fibreglass or Kevlar® the chemical reaction heat source material may be provided in the form of a powder or a 'crumble'.

It is appreciated that surrounding the chemical reaction heat source material with refractory material provides similar benefits as are achieved by providing a refractory lining on the inside of a heater body (i.e. preventing 'burn-through' of the tubular heater body into which the cartridge is inserted).

As with the cartridge of the first aspect of the present invention, it is envisaged that the cartridge variant of the four aspect of the present invention can be used in combination with the both the well plugging/sealing tool of the second aspect of the present invention and the refractory lined chemical heater of the third aspect of the present invention.

In the case of the combined use of the refractory variant of the cartridge with the refractory lined heater, it will be appreciated that providing two distinct refractory layers will provide additional protection to the heater body.

It has been discovered that by protecting the inner walls of the heater body, by wrapping the chemical heat source and/or lining the inner walls with a refractory material, makes it possible to reduce the thickness of the heater body wall by about 30% (e.g. by about 6 to 9 mm in the case of a heater with a 60 mm outer diameter), which again helps to reduce the overall diameter of the well tool. In the absence of the intermediary role of the flexible elongate surround and/or the refractory lining any heater body with a reduced thickness would be vulnerable to melting under the heat generated by the chemical heat source.

BRIEF DESCRIPTION OF THE DRAWINGS

The various aspects of the present invention will now be described with reference to preferred embodiments shown in the drawings, wherein.

DETAILED DESCRIPTION OF THE VARIOUS ASPECTS OF THE PRESENT INVENTION

Although eutectic/bismuth based alloys are referred to throughout the present disclosure it is appreciated that low melt alloys' or low melting point alloys' may also be used interchangeably with the eutectic/bismuth based alloys used in the tools of the present invention. The low melting point alloy group is defined as those alloys that have a melting point of 385° C. or below.

The various aspects of the present invention disclosed herein are considered particularly suitable for use in downhole operations that take place within gas and oil wells. In particular the well plug of the present invention is considered particularly suitable for use in repair operations involving Open Hole Gravel Packs.

The term 'Open Hole Gravel Pack' (OHGP) is used throughout to indicate when a screen is used to hold back proppant/sand in a completion. It will be appreciated that, in practise, this covers all gravel pack completions including open hole, cased hole and frac packs.

Although the sealing and repair of Open Hole Gravel Pack is considered a particular suitable application of the present invention, it is envisioned that the various aspects of the present invention can also be employed in other well repair operations as well as in well abandonment.

Given the main focus of the present invention, the preferred embodiments will be described from this point of view. However, it is envisioned that the apparatus and methods described could be usefully applied in other technical fields, such as those fields where underground conduits are to be plugged (e.g. water pipes).

The first aspect of the present invention relates to a chemical heater cartridge 1 that is considered particularly suitable for use in chemical heaters that are deployed in various down-hole operations (e.g. forming eutectic/bismuth based alloy plugs).

Figure 1:
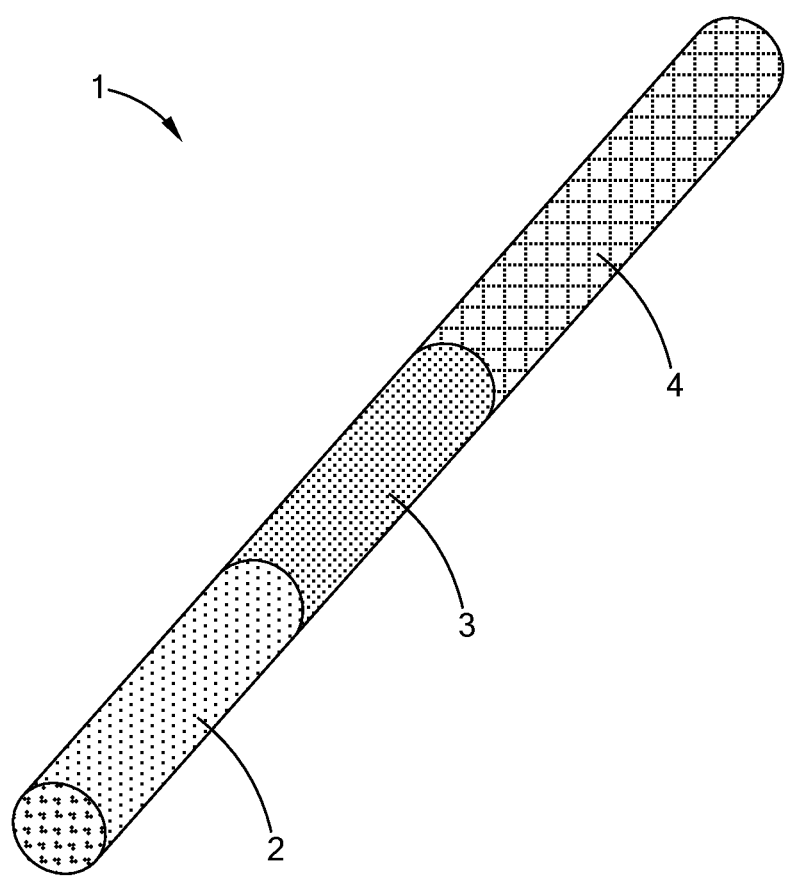
FIG. 1 shows partially exposed view of a cartridge according to a first aspect of the present invention.

An example of a cartridge 1 in accordance with the first aspect of the present invention is shown in FIG. 1. The cartridge 1, which is preferably tubular in shape to suit the internal cavity of the heating tools in which it can be used, is formed from a solid block 2 of a chemical heat source material, such as thermite.

In use the thermite material, for example, will undergo an extreme chemical reaction that generates a large amount of heat energy. It is this heat energy which is harnessed by a heater tool down a well to melt an alloy and form a plug.

Although only one block of the material is shown in FIG. 1 it is anticipated that multiple blocks of chemical heat source material could be placed together in the cartridge 1. In particular, it is envisioned that a collection of blocks with different thermite mixtures could be placed together to create a specific heating pattern. More details on this are provided in WO 2014/096857 A2, which is an earlier disclosure by the inventors.

As will be appreciated from FIG. 1, the block 2 is surrounded by a wrap 3. The wrap 3, which is preferably a shrink wrap of a plastic film material (e.g. PVC), serves to maintain the shape of the wrapped block 2 and, in the case of multiple blocks, keep the blocks closely packed together. This is important because it prevents the formation of gaps between the blocks 2 during transport, which can affect the progression of the cartridge's burn during the chemical reaction.

The final outer layer of the cartridge 1 is provided by the tubular surround 4, which is preferably formed from a material with insulating properties such as fibre glass. In use, when the cartridge is housed within the cavity of a heater body (not shown), the tubular surround 4 provides an element of protection to the walls of the heater body.

Protecting the heater walls in this way allows for the option of reducing the thickness of the heater body without increasing the risk of the heater walls being melted by the heat given out by the cartridge 1.

FIG. 1 shows an exposed view of the cartridge 1 so that the various layers can be appreciated. In the complete cartridge the wrap 3 would completely surround the blocks of chemical heat source material 2 and the surround 4 would form the outer surface of the cartridge 1.

Figure 2:
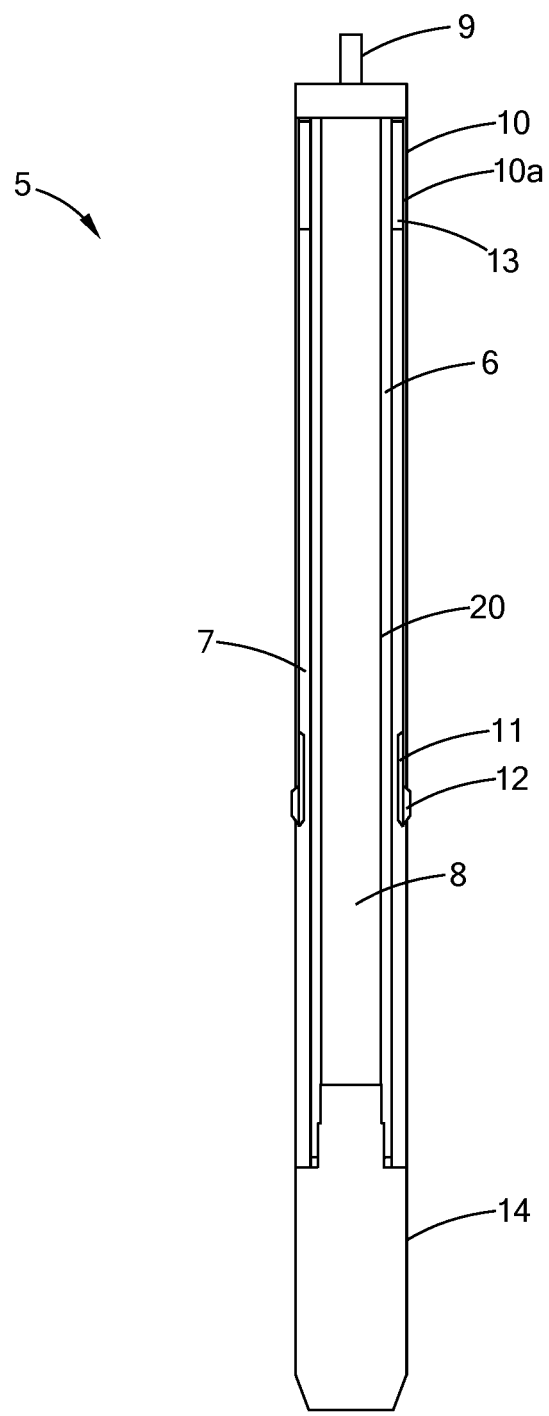
FIG. 2 shows a cross-sectional view of a well plugging/sealing tool according to a second aspect of the present invention.

FIG. 2 shows a well plugging/sealing tool 5 in accordance with a second aspect of the present invention. Although it is envisioned that the cartridge of the first aspect of the present invention may be used with the tool 5, this is not essential. The assembly is shown without a cartridge to avoid over-complicating the drawing. This is also the case with FIG. 3.

The well plugging/sealing tool 5 is formed from a centrally located heater body 6 made, for example, from steel, aluminium, stainless steel, carbon fibre, high temperature plastic. The heater body 6 is provided with a suitable eutectic/bismuth based alloy 7 along majority of its outside length.

The heater body 6 is also provided with a cavity 8 that, in use, receives a chemical heat source material, which may advantageously, but not essentially, be in the form of the cartridge of the first aspect of the present invention. As noted above, using the cartridge of the present invention within the cavity 8 of the heater body 6 would allow the thickness of the heater body walls to be reduced without making the heater body more vulnerable to melting by the heat generated within its cavity.

However it is envisaged that the internal walls of the heater body 6 might alternatively, or additionally, be protected by coating the inner walls of the heater body that define the cavity 8 with a lining of refractory material 20 (shown as dashed line for ease of identification).

Preferably the walls of the cavity are coated with zirconium oxide ($ZrO_2$), otherwise known as zirconium dioxide or zirconia. However alternatives refractory materials are envisaged, with suitable alternative including fibre glass, Kevlar® and other ceramic materials such as aluminium oxide and magnesium oxide.

It is also envisaged that the zirconium oxide may also be partially stabilized using dopants such as yttrium oxide, magnesium oxide, calcium oxide, and cerium (III) oxide.

In a preferred embodiment, the zirconium oxide coating is applied to the inner walls of the heater body 6 using a drip process. The preferred coating process involves dripping a suitable water-based slurry containing zirconium oxide (an example of which is PyroPaint 634ZO, available from Aremco, 707-B Executive Boulevard, Valley Cottage, N.Y. 10989) in to a tubular heater body that is titled at an angle of between 5-30 degrees.

Before the slurry is applied, the internal cavity of the tubular heater body is first treated with a phosphoric acid solution and then rinsed with clean water to as to clean the inner walls of the tubular heater body to ensure the walls are ready to receive the coating. It will be appreciated that other acids, such as hydrochloric acid, may also be used to treat the tubular heater body.

Alternative methods for cleaning the inner walls in preparation for receiving the coating include: sand blasting, grit blasting, mechanical roughening (e.g. sanding down). The skilled person will appreciate that further alternative methods might be employed without departing from the present invention.

Once clean, the tubular heater body is rotated at a rate of between 20 to 60 revolutions per minute (RPM) as the slurry is dripped into the cavity of the tubular heater body via the elevated opening at the end of the tubing. In this way the inner walls of the tubular heater body are coated with the zirconium oxide slurry.

Once the coating has been applied, the tubular heater body is placed in an oven and cured at about 90° C. for around 1 to 4 hours. Using this method it has been possible to achieve a coating thickness of between 0.002 inches and 0.020 inches on the inner walls of the heater body.

Once the coating is cured, the heater end tubes are capped off with welded and/or threaded plugs and filled with the thermite chemical heat source.

Although the drip process is considered preferable due to its economic efficiency, it is envisaged that the coating may be applied using alternative approaches such as vapour deposition and spraying (including thermal spraying).

It is envisaged that the above coating process can be used to apply the refractory lining to a variety of tubular heater bodies; that is to say heaters with or without the features of the externally mounted alloy and protective sleeve.

The heater body 6 and the alloy 7 are mounted to connection means 9 such that the tool 5 can be attached to a well deployment tool (not shown) for delivery down-hole.

A sleeve 10 is provided on the outer surface of a majority (preferably about ⅔ of the total length) of the well plugging/sealing tool 5. The sleeve 10 acts with the heater body 6 to almost completely envelop the alloy 7 with an annular space between the sleeve and the heater body 6.

As detailed above the sleeve 10 serves to protect the alloy 7. In a first instance the sleeve protects the alloy mechanically as the well plug travels down-hole to the target region. To achieve this, the sleeve is preferably made using a structurally strong and resilient material, such as thin steel or Kevlar® tubing. The mechanical protection is considered particularly necessary when the well plug assembly is being deployed in highly deviated wells (i.e. wells with not vertical orientations).

In a second instance the sleeve protects the alloy by insulating it from the down-hole environment. To achieve this, the sleeve is preferably made using a material with suitable insulating properties, such as fibre glass. It is envisaged that while the sleeve does not necessarily need to provide mechanical protection, particularly in cases where the well path is more of a vertical nature, the insulating protection provided by the sleeve is considered to be applicable in most applications of the present invention.

As detailed above, providing an insulating layer outside the alloy serves to not only retain heat within the well tool 5 for longer—thus achieving more efficient heat generation—but it also counters the loss of heat that might occur to fluids flowing passed the well tool within the target region.

The well plugging/sealing tool 5 shown in FIG. 2 is provided with both a mechanically protective outer sleeve 10 (e.g. thin steel) and an insulating sleeve layer 10*a* (e.g. fibre glass). However it is envisaged that a composite material with suitable structural and heat retaining characteristic might be employed instead of the two layer sleeve arrangement.

As can be seen from FIG. 2, the sleeve 10 only extends along a portion of the full length of the well plugging/sealing tool 5. As a result, a portion of the alloy and the heater are not shielded by the sleeve 10.

The partial coverage of the alloy by the sleeve causes the covered alloy to become super-heated within the annular space between the heater and the sleeve because the alloy's only escape route is located at the point where the sleeve ends. It is envisaged that the positioning of the sleeve's end point can therefore be used to focus where the molten alloy is ejected into the surrounding well environment.

By ejecting super-heated molten alloy in this way, rather than releasing it more slowly from along the entire length of the well plug, it is possible to get the alloy to travel much further before it cools and solidifies. This is considered particularly advantageous when forming seals in sand pack formations (i.e. OHGPs), because the alloy can penetrate much further into the sand pack before it finally sets—thus forming a better seal.

The well tool 5 shown in FIG. 2 is also provided with wear pads 12 located on spacers 11 that project out radially from the sleeve 10 of the well tool 5. This arrangement serves to further protect the well tool from damage during its deployment down-hole.

Although only a pair of wear pads 12 is shown in FIG. 2, it will be appreciated that the pads could be arranged periodically around the entire circumference of the outer surface of the well tool 5. It is also envisaged that multiple sets of wear pads could advantageously be positioned along the length of the well plug's outer surface.

Advantageously the annular space between the heater 6 and the sleeve is not entirely filed with alloy 7. Instead, and as will be appreciated from FIGS. 2 and 3, a spacer element 13 is provided in the annular space above the alloy 7.

The spacer element 13, which is preferably made from a structurally robust material such as steel, provides the well plug with a structurally reinforced region that can be more readily used by gripping machines to pick the well plug up during above-ground handling operations. It is envisaged that without the space element 13, a gripping machine would be more likely to crush the well plug due to the soft nature of eutectic/bismuth based alloys.

Finally, the well tool 5 is provided with a skirt 14 on its leading end. The skirt 14, which is essentially an open ended tube attached to the end of the heater body 6, allows well fluids to flow in and out of the open end thereby removing heat from the system and allowing the alloy to cool as it moves away from the heater body 6.

Figure 3:
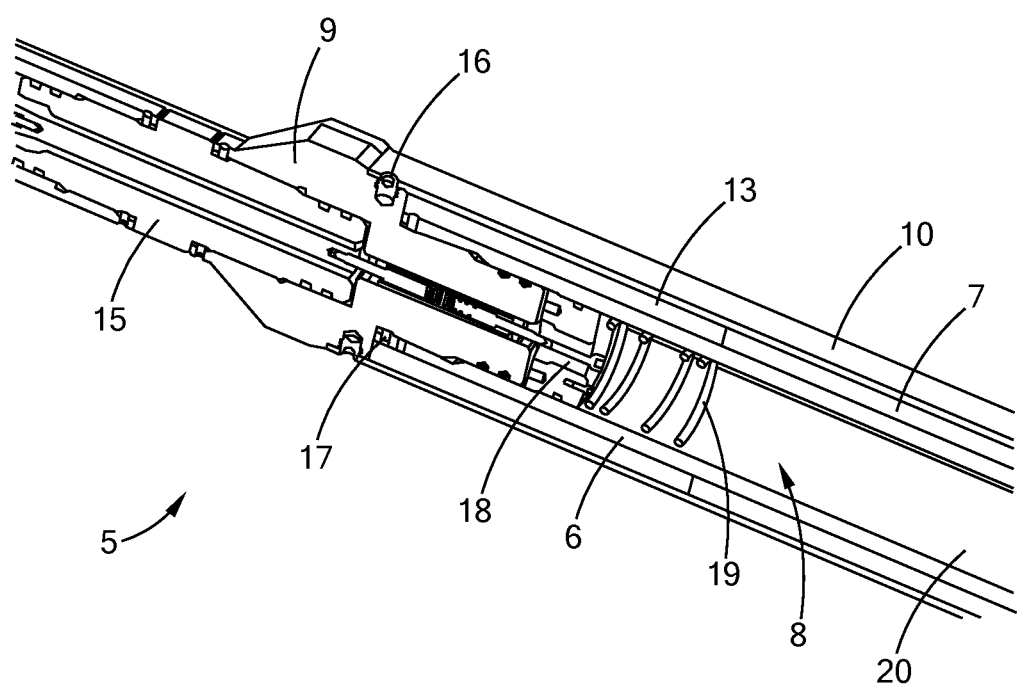
FIG. 3 shows a closer view of the well tool shown in FIG. 2.

The above described features of the well plugging/sealing tool 5 will be further appreciated from FIG. 3, which show a more detailed view of the top end of the well plug together with part of a well deployment tool 15.

As can be seen, the well plugging/sealing tool 5 is connected to a well deployment tool 15 via connection means 5. The connection means 5 also serves to hold the heater body 6 and the sleeve 10 together by way of grub screws 16 (sleeve to connection means) and 17 (heater body to connection means).

Within the cavity 8 of the heater body is provided an ignition device 18, which is in operable communication with an operator at ground level via a linkage that passed through the connection means 9 and the well deployment tool 15.

Also located within the cavity 8 is a spring 19. The spring 19, one end of which urges against the ignition device 18, is used to urge the blocks of the chemical heat source material housed in the cavity together so as to illuminate unwanted gaps between the blocks (not shown). Preferably the spring is provided with a washer (not shown) that increases the surface area pushing against the blocks.

The positioning of the spacer element 13 relative to the alloy 7 within the annular space provide between the heater body 6 and the sleeve 10 will be better appreciated from FIG. 3. In particular it will be noted that the spacer is located in a region that is not aligned with the heater cavity 8 into which the chemical heat source material is received. The alloy, however, is aligned with the heater cavity so as to ensure it is adequately heated by the chemical reaction heat source (e.g. thermite).

The invention claimed is:

1. A cartridge for a chemical heater used in down-hole operations, the cartridge comprising a plurality of chemical reaction heat sources, wherein the plurality of chemical reaction heat sources are configured to define a shape of the cartridge, and wherein the plurality of chemical reaction heat sources are wrapped and completely surrounded in a temporary coating; whereby the temporary coating maintains the shape of the cartridge during insertion into a well, and whereby the temporary coating is consumed during the burn of the heater.

2. The cartridge of claim 1, wherein the heat source is wrapped in a plastic film.

3. The cartridge of claim 1 or 2, wherein the wrapped heat source is held within a flexible elongate surround member.

4. The cartridge of claim 1 or 2, comprising a flexible surround member, wherein the flexible surround is formed from one or more of the following: fibre glass, thin steel, carbon fibre, and synthetic fibre of a high tensile strength (e.g. Kevlar®).

5. The cartridge of claim 1 or 2, wherein the chemical reaction heat source is provided in the form of one or more blocks.

\* \* \* \* \*